Jan. 10, 1956  R. A. FRYKLUND  2,729,910
CONTROLLABLE DEPTH MAINTAINING DEVICES
Filed April 26, 1950  4 Sheets-Sheet 1
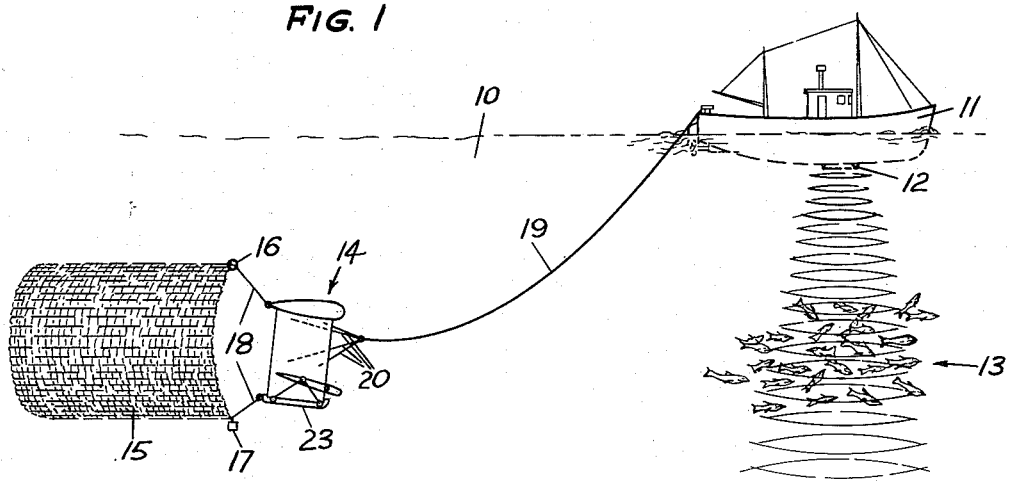
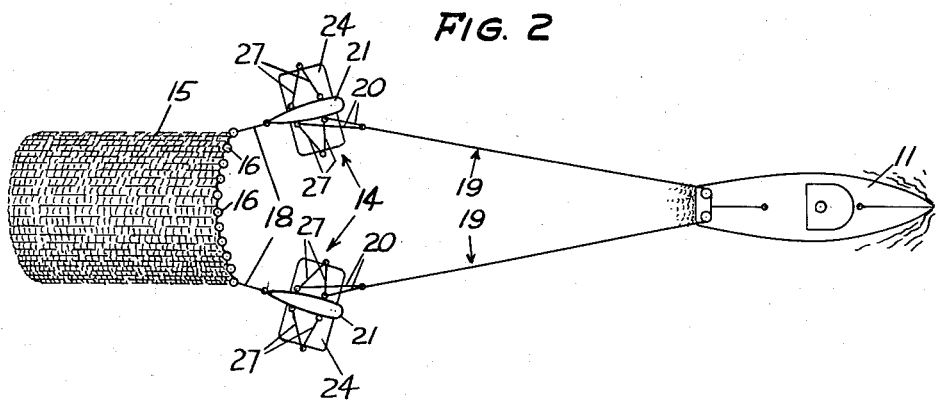
INVENTOR
ROBERT A. FRYKLUND
BY
ATTORNEY

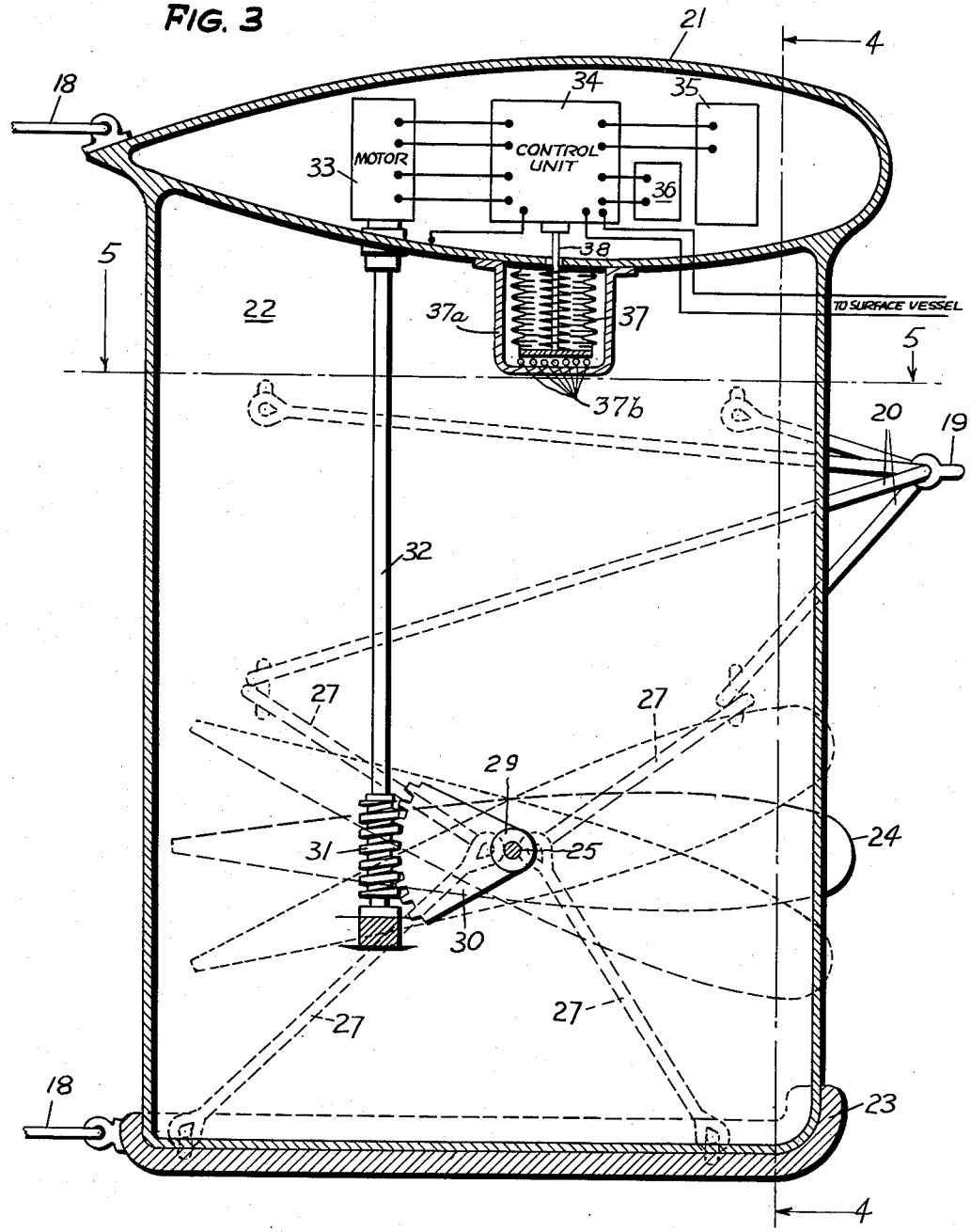

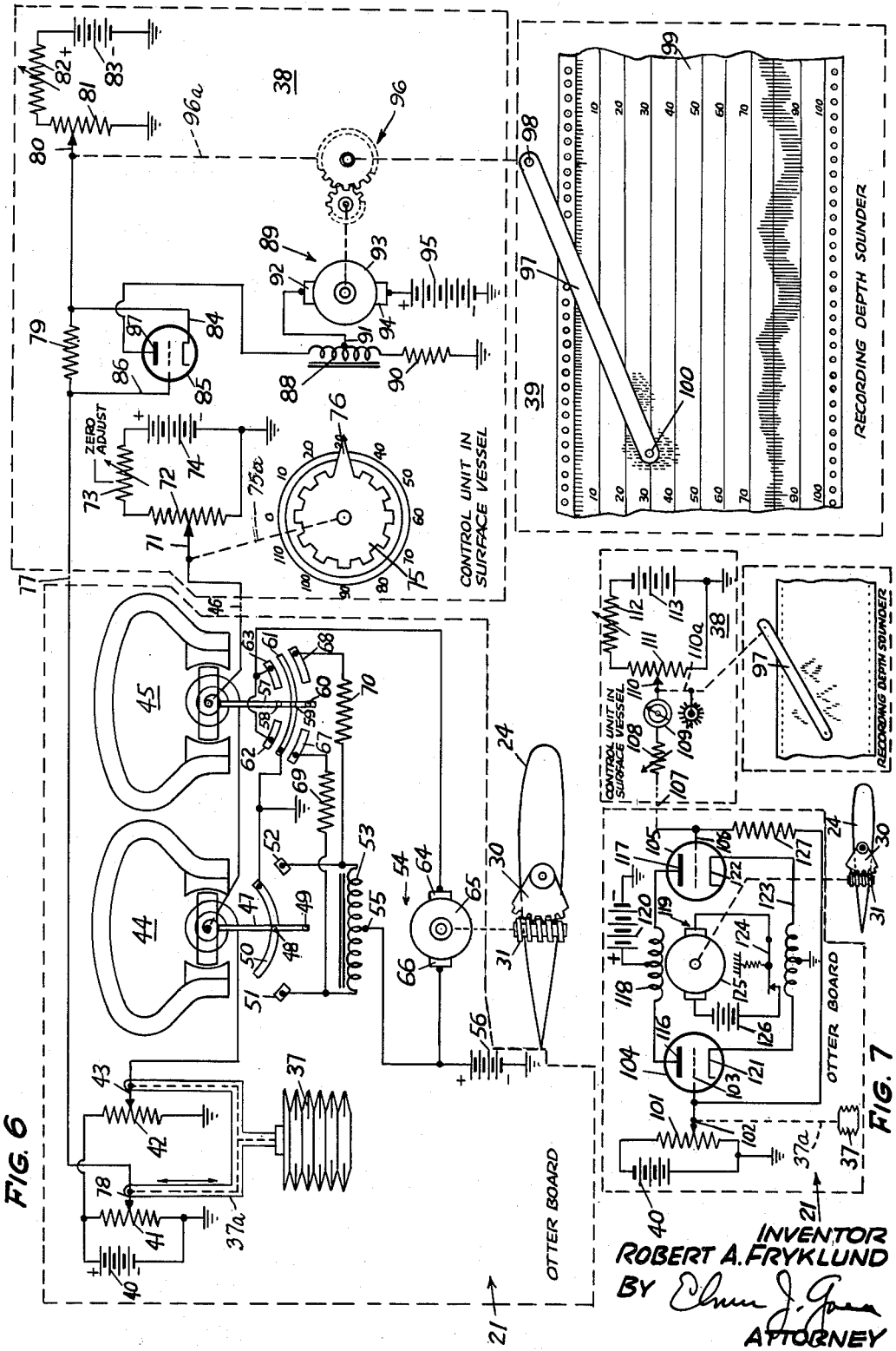

Jan. 10, 1956　　　　R. A. FRYKLUND　　　2,729,910
CONTROLLABLE DEPTH MAINTAINING DEVICES
Filed April 26, 1950　　　　　　　　　　　4 Sheets-Sheet 4

INVENTOR
ROBERT A. FRYKLUND
BY
ATTORNEY

United States Patent Office

2,729,910
Patented Jan. 10, 1956

2,729,910

CONTROLLABLE DEPTH MAINTAINING DEVICES

Robert A. Fryklund, Dedham, Mass., assignor to Raytheon Manufacturing Company, Newton, Mass., a corporation of Delaware Application April 26, 1950, Serial No. 158,307

10 Claims. (Cl. 43—9)

This invention relates to apparatus for maintaining a submerged body at a predetermined depth, and more particularly to means whereby a fishing net towed by a vessel may be automatically maintained at a predetermined depth, said depth being adjustable at will.

It is well known that fish may be located by means of sonic depth sounding equipment, and this equipment is widely used in the commercial fishing industry for this purpose. While commercial fishing today employs methods whereby fish either near the surface or near the bottom of the water may be netted, no feasible method has heretofore been devised for netting fish in the area intermediate the bottom and the top of the water. Since the depth sounding device indicates that large schools of fish inhabit this intermediate region, it is desirable to be able to net fish in this area.

This invention discloses apparatus whereby fish may be netted at any desired depth. Briefly, this invention comprises the use of a dragger type net such as is normally used for fishing at the bottom of the water body and an otter board arrangement having controllable diving planes, the position of said diving planes being controlled by a depth sensitive device whereby said otter board structure, and hence the depth of a net connected thereto, is maintained at any desired predetermined depth. The depth sensitive device may utilize, for example, any of the well-known pressure gauge mechanisms for creating a control movement, said movement being used to produce an electrical control signal which, in turn, is used to drive a reversible electric motor mechanically connected to the diving planes.

In addition, this invention discloses means whereby a control signal generated in the surface vessel towing the otter board structure may be sent to the otter board structure to determine the depth at which the otter board structure will be maintained by the depth sensitive device.

Further, the invention discloses a device whereby a signal indicative of the depth of the otter board structure is sent from the otter board structure to the controlling vessel and is utilized to control a cursor associated with a recording sonic depth sounder to indicate the actual depth of the otter board structure on the recording medium of said depth sounder. Thus, when the depth sounding device indicates the presence of a school of fish at a particular depth, adjustment of the control signal in the surface vessel will cause the otter board structure to dive to the desired depth to net the school of fish.

Other and further advantages of this invention will become apparent as the description thereof progresses, reference being had to the accompanying drawings, wherein:

Fig. 1 illustrates an elevation view through the water showing the surface vessel, the depth sounding device in the surface vessel, the controllable otter board structure and the net attached thereto;

Fig. 2 illustrates a top plan view of the otter board structure illustrated in Fig. 1;

Fig. 3 illustrates a longitudinal, cross-sectional view of a controllable otter board illustrating the details of the control mechanism and taken along line 3—3 of Fig. 4;

Fig. 6 illustrates a circuit diagram of one type of control circuit which may be utilized in this invention as set forth in Figs. 1 through 5; and Fig. 7 illustrates a second control circuit which may be utilized in this invention.

Figure 4:
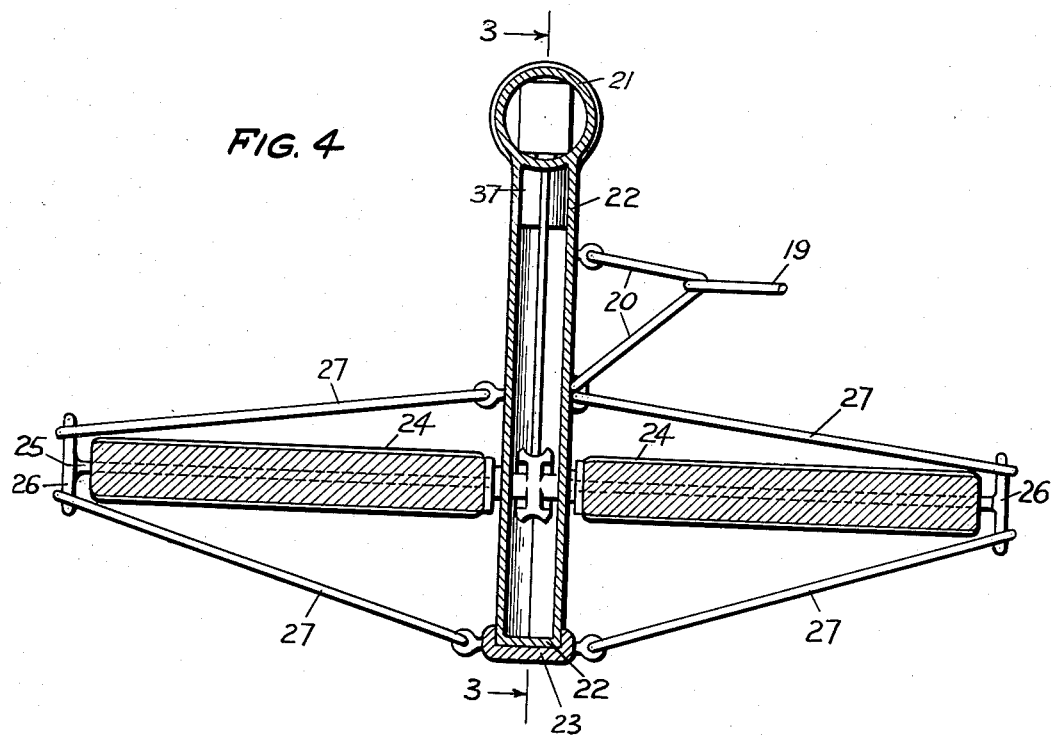
Fig. 4 illustrates a longitudinal, cross-sectional view of the device shown in Fig. 3 taken along line 4—4 of Fig. 3.

Referring now to Figs. 1 and 2, there is shown a body of water 10 having a vessel 11 moving across the surface thereof. Vessel 11 contains a sonic depth sounder 12 which is used to locate schools of fish 13. The use of a sonic depth sounder to locate fish is well known to those skilled in the art. A suitable depth sounder is shown in Patent No. 2,033,160 by E. E. Turner, Jr., issued March 10, 1936 entitled, "Method and Apparatus for Measuring Depths." Towed behind vessel 11 is a controllable otter board structure comprising two otter board units 14. Attached to said otter board units is a net 15 which is bag-shaped with the mouth thereof being drawn through the water by the otter boards. The top of the mouth is attached to floats 16, while the bottom thereof is attached to weights 17, thus tending to keep the mouth of the net open as it is drawn through the water. The otter board units are attached one at each side of the mouth of the net 15, each otter board unit being attached, for example, by two lines 18 adjacent the top and bottom corners of the net 15.

Each otter board is attached to a separate tow line 19 extending to the vessel 11 and attached to the otter board by a harness 20 connected to one side thereof such that the otter boards tend to diverge as they are drawn through the water, thus maintaining the mouth of the net open.

Figure 5:
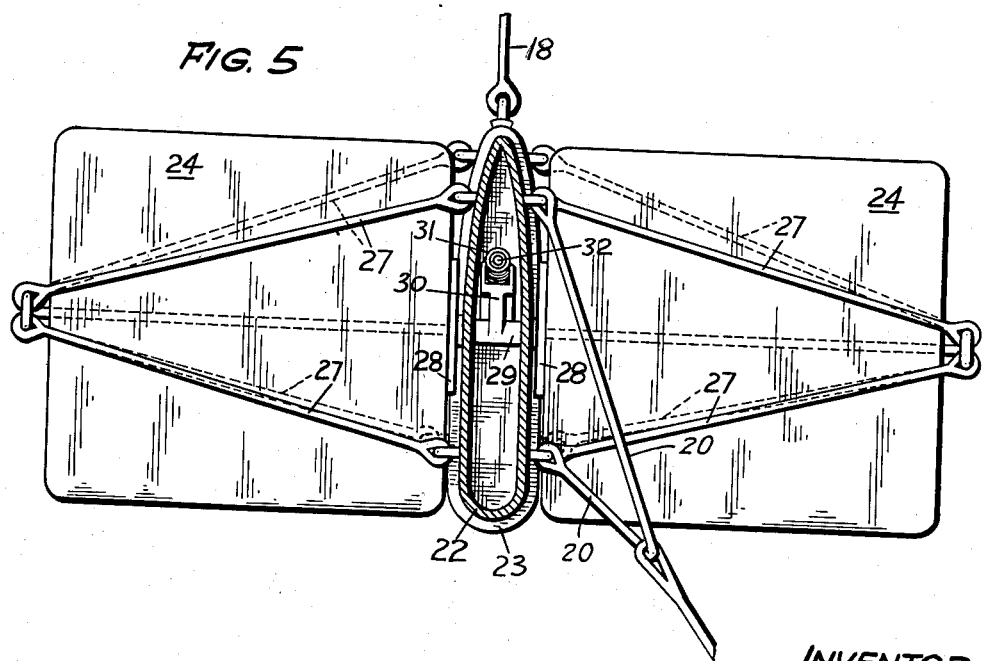
Fig. 5 illustrates a transverse, cross-sectional view of the device shown in Fig. 3 taken along line 5—5 of Fig. 3.

Referring now to Figs. 3, 4 and 5, an otter board unit will be described in detail. Each otter board has at the top thereof a buoyant torpedo-shaped float 21. Extending downwardly from float 21 is a vertical rib 22, the bottom of said rib terminating in a heavy weighted shoe 23 whereby the otter board unit will normally be maintained in an upright position in the water. Extending outwardly from vertical rib 22 at a point approximately three-quarters of the distance down from the top thereof is a pair of diving planes 24, one on each side of rib 22.

Diving planes 24 may be of any desired material, such as wood, steel or cast iron and have a streamline cross-section so that they will move easily through the water. Planes 24 are rotatably mounted on a shaft 25 extending through the diving planes perpendicular to the vertical rib 22, shaft 25 terminating at either end in caps 26 from which stay rods 27 extend to the vertical rib 22 and the shoe 23 to prevent the bending of shaft 25 by the force of the water on planes 24. While planes 24, as shown here, have a surface area which is generally of rectangular form, they may be made in any desired shape and curvature.

Planes 24 are attached at the sides thereof adjacent vertical member 22 to flanges 28 which are connected to a shaft 29 rotatable on shaft 25 and extending through vertical rib 22. Shaft 29 is attached inside rib 22 to a section of a worm gear 30. Worm gear 30 engages a worm 31 which is driven by means of a shaft 32 from a reversible electric motor 33 positioned inside float 21.

The rotation of motor 33 is controlled by a control unit 34 which is supplied with power from batteries 35 and 36 which are located in float 21 of the otter board. A mechanical control signal is fed into control unit 34 by means of a pressure sensitive device 37 which is shown here as a simple bellows arrangement situated in housing 37a and exposed to the external pressure of the water by means of a plurality of holes 37b located in said housing. As the pressure increases, motion is imparted to a rod 38 attached to bellows 37 and extending into the control unit 34.

Referring now to Fig. 6, there is shown a circuit diagram illustrating one form of the control unit and associated electrical structure. This structure comprises three separate units, namely, the otter board control unit 34, a control unit 38 in the surface vessel and a recording depth sounder 39 in the surface vessel.

The otter board control unit 34 comprises a battery 40 across which is attached a potentiometer 42. The movable arm 43 of potentiometer 42 is mechanically ganged by linkage 37a to the pressure sensitive device 37. The movable arm 43 of potentiometer 42 is connected through two sensitive relays 44 and 45 shown here, by way of example, as galvanometer movement type relays to a cable 46 which extends to the control unit 38 in the surface vessel.

Relay 44 has an arm 47 to which is attached a pair of movable contacts 48 and 49 which are electrically connected together through arm 47. Contact 48 is in continuous contact with an elongated stationary contact 50 which is grounded. Contact 49 is adapted to engage either of two contacts 51 or 52 dependent on the direction of current through relay 44. Contacts 51 and 52 are connected to opposite ends of a field coil 53 of a direct current motor 54. Field coil 53 has a center tap 55 which is connected through a battery 56 to ground. Batteries 40 and 56 are located in float 21 and are equivalent to batteries 35 and 36, respectively, that are illustrated in Fig. 3.

Relay 45 has a movable arm 57 having three movable contacts 58, 59 and 60 thereon, said contacts being electrically connected together through arm 57. Contact 59 is in continuous contact with an elongated stationary contact 61 which is grounded. Contact 58 is adapted to contact either of two contacts 62 or 63 when arm 57 is moved a predetermined amount in either direction. Contacts 62 and 63 are connected together and are connected to one brush 64 contacting the armature 65 of motor 54; the other brush 66 contacting armature 65 is connected to the center tap 55 of field coil 53. Movable contact 60 is adapted to contact either of two stationary contacts 67 or 68 dependent on the polarity of the current through relay 45. Contacts 67 and 68 are connected to contacts 51 and 52, respectively, through resistors 69 and 70. Contacts 67 and 68 extend closer to the center position of arm 57 than do contacts 51 and 52 with respect to arm 47. Hence, a smaller amount of current through relays 44 and 45 will energize either of the contacts 67 and 68 than will be required to energize contacts 51 or 52.

Motor armature 65 is connected to the worm 31 which actuates the diving planes 24 through worm gear 30, as previously described. Cable 46 extending to the control unit 38 in the surface vessel is attached to the arm 71 of a potentiometer 72, one side of which is grounded, and the other side of which is connected through an adjustable resistor 73 to a terminal of a battery 74, the other terminal of which is grounded.

Arm 71 of the potentiometer 72 is mechanically ganged by linkage 75a to a knob 75 having a pointer 76 thereon which indicates depth in fathoms. Adjustment of knob 75 causes adjustment of the depth of the otter board device in the following manner. The arm 71 is moved to a predetermined position on potentiometer 72 and, therefore, is at a predetermined potential with respect to ground. The otter board control unit and the control unit in the vessel have a common ground connection through the water. As long as the currents flowing from the control unit in the surface vessel to the otter board control unit are small, for example, on the order of microamperes, the resistance of the water will produce substantially no error in the operation of the device.

If the potential of arm 71 is not equal to the potential of arm 43 as determined by the pressure sensitive device 37, a current will flow through relays 44 and 45. If the difference is small, the contacts of relay 44 will not be energized, while the contacts of relay 45 will be energized, thus causing the motor 54 to rotate at a relatively slow speed to produce a change in the angle of attack of the diving planes 24 on the water to correct the depth of the otter board unit. If the difference in potential between arms 43 and 71 is large, relay 44 will have the contacts thereof energized, thus causing the motor 54 to rotate at an increased rate to provide an increased rate of correction on the angle of attack on diving planes 24.

As the otter board unit approaches the correct depth, the contacts of relay 44 will be deenergized, while the contacts of relay 45 will remain energized, and the motor will cause a correction at a reduced rate. This reduced rate will be determined by the value of resistors 69 and 70 which will control the magnitude of the current flow through the field coil 53. While each of the otter board units 14 may, if desired, be controlled by a separate potentiometer 72 in the surface vessel, this invention contemplates the operation of both otter board units in parallel from a single cable 46 and control potentiometer 72.

In order to ascertain that the depth of the otter board unit is being correctly maintained and thereby to be sure that the control mechanism is functioning properly, a second cable 77 is run from the arm 78 of potentiometer 41, which is connected across battery 40 in one of the units 14, to the control unit 38 in the surface vessel. Arm 78 is moved by pressure-sensitive device 37 by means of the mechanical linkage 37a. In control unit 38, the cable 77 is connected through a load resistor 79 to the movable arm 80 of potentiometer 81. One end of potentiometer 81 is connected to ground, and the other end of potentiometer 81 is connected through a variable resistor 82 to one terminal of a battery 83, the other terminal of which is grounded.

Movable arm 80 of potentiometer 81 is connected to the cathode 84 of a vacuum tube 85. The grid 86 of vacuum tube 85 is connected to the opposite end of resistor 79 from cathode 84, and the plate 87 of vacuum tube 85 is connected through field coil 88 of a reversible direct current motor 89 and a resistor 90 to ground. Field coil 88 is center tapped, at 91, said center tap being connected to one brush 92 contacting the armature 93 of motor 89. The other brush 94 contacting the armature 93 is connected to the positive terminal of a battery 95, the other terminal of which is grounded. The armature 93 of motor 89 is mechanically connected through a gear reduction unit 96 and linkage 96a to potentiometer arm 80 and to a cursor 97 attached to a recording depth sounder. Cursor 97 may be, for example, pivoted, as at 98, adjacent one end thereof such that motor 89 causes the rotation of cursor 97 about pivot 98. The other end of cursor 97 extends onto the electrosensitive recording paper 99 of the depth sounder 39 and may, if desired, carry a marking device 100 which produces a mark on paper 99 indicative of the depth of the otter board control unit.

To adjust the system, the control dial 75 is set at zero, and the variable resistor 73 is adjusted until the otter board unit just dives below the surface of the water. The resistor 82 is then adjusted such that the cursor 97 has the marking device 100 positioned at the zero or upper edge of the recording paper 99.

Referring now to Fig. 7, there is shown another species of the control circuit. In the otter board control unit 34, there is positioned a battery 40, one side of which is grounded and across which is connected a potentiometer 101. The movable arm 102 of potentiometer 101 is mechanically ganged by linkage 37a to the pressure sensitive device 37 and is electrically connected to the grid 103 of a vacuum tube 104.

A second vacuum tube 105 has the grid 106 thereof connected through a cable 107 to the control unit 38 in the surface vessel where it is connected through an adjustable resistor 108 and a sensitive meter 109 to the movable arm 110 of potentiometer 111. One side of potentiometer 111 is grounded, and the other side is connected through a variable resistor 112 to a common terminal of a battery 113, the other terminal of which is grounded.

Movable arm 110 is mechanically ganged by linkage 110a to cursor 97 in the recording depth sounder similar to that shown in Fig. 6. The plates 116 and 117 of tubes 104 and 105 are connected, respectively, to the opposite ends of the field coil 118 of a reversible direct current motor 119. Field coil 118 is center tapped, said center tap being connected to the positive terminal of a battery 120, the negative terminal of which is grounded. The cathodes 121 and 122 are connected to the opposite ends of a polarized minimum current relay coil 123, the center tap of which is grounded. Battery 40 illustrated in Fig. 7 is located in float 21 and is equivalent to battery 40 illustrated in Fig. 6.

Coil 123 actuates a movable contact 124 when the currents to cathodes 121 and 122 are sufficiently different, thereby energizing armature 125 of motor 119 from a battery 126. Armature 125 is mechanically connected to worm 31 to drive diving plates 24 through worm gear 30. Grids 103 and 106 are connected together through a resistor 127. Batteries 120 and 126 are located in float 21 and perform equivalent functions of battery 56, illustrated in Fig. 6, and battery 36 illustrated in Fig. 3.

In operation, the potentiometer arm 110 is set at a given depth, thereby causing a particular potential to be applied to movable arm 110 and hence to grid 106. If the potential of movable arm 102, as determined by the depth of the otter board unit through pressure sensitive element 37 and linkage 37a, differs from the potential of arm 110, a greater current will flow through one or the other of tubes 104 or 105, thereby causing relay contact 124 to be energized to feed current to armature 119.

In addition, a difference in current through the two halves of the field coil will produce a field of one direction causing a particular direction of rotation of the motor 119 in a well-known manner. The amount by which the potential of movable arm 102 differs from the potential of movable arm 110 and the polarity of the difference may be determined by the current passing through meter 109, and hence reference to said meter will indicate whether the ottor board control unit is responding to the setting of potentiometer 111. The amount of deviation between the depth of otter board control unit and the setting of potentiometer 111 may be accurately determined, if desired, by calibrating meter 109 by means of variable resistor 108. Since the indicating currents flowing through resistor 127, resistor 108 and meter 109 are extremely small, for example, on the order of microamperes, there will be no serious distortion of the control signals generated by potentiometers 101 and 111. Further, when the system is in balance, there will be no current flowing through resistor 127 and hence no distortion thereof.

This completes the description of the particular embodiments of the invention disclosed herein. However, many modifications thereof will be apparent to persons skilled in the art without departing from the spirit and scope of this invention. Any depth sensitive device other than the pressure gauge 37 could be used. Other drag line connections could be made between the otter board units and the net than those illustrated in Figs. 1 and 2.

Furthermore, the invention is not necessarily limited to devices towed through the water but could be used with devices which were to be maintained at a stationary position under the water with controllable ballast and buoyancy tanks being substituted for the diving planes. Also, the device is not necessarily limited to use with recording depth sounders, but may also be used with nonrecording depth sounders on other fish location devices.

Therefore, applicant does not wish to be limited to the particular details of the species of the invention described herein, except as defined by the appended claims.

What is claimed is:

1. In a surface vessel provided with depth sounding means adapted to locate and record the depth of a school of fish, the improvement comprising an otter board towed by said vessel and adapted to be connected to said net, a controllable diving plane attached to said otter board and an electric motor controlling said plane in response to the depth of said otter board.

2. In combination, a surface vessel, a fish net, means for positioning said net at a predetermined depth comprising an otter board towed by said vessel and adapted to be connected to said net, a controllable diving plane attached to said otter board, an electric motor controlling said plane in response to the depth of said otter board, and means for adjusting the depth at which said electric motor maintains said otter board comprising means for generating a controllable signal in said surface vessel and transmitting said signal to said electric motor.

3. In combination, a surface vessel, a fish net, means for positioning said net at a predetermined depth comprising an otter board towed by said vessel and adapted to be connected to said net, a controllable diving plane attached to said otter board, an electric motor controlling said plane, and a control unit connected to said electric motor for controlling the direction of rotation thereof, said control unit being responsive to the depth thereof.

4. In combination, a surface vessel, a fish net, means for positioning said net at a predetermined depth comprising an otter board towed by said vessel and adapted to be connected to said net, a controllable diving plane attached to said otter board, an electric motor controlling said plane, a control unit connected to said electric motor for controlling the direction of rotation thereof, and means for adjusting the depth at which said electric motor maintains said otter board comprising means for generating a controllable signal in said surface vessel and transmitting said signal to said control unit, said control unit being responsive to the depth thereof.

5. In a surface vessel provided with depth sounding means adapted to locate and record the depth of a school of fish, the improvement comprising a fish net, an otter board towed by said vessel and adapted to be connected to said net, a controllable diving plane attached to said otter board, an electric motor controlling said plane, a control unit connected to said electric motor for controlling the direction of rotation thereof, and means for adjusting the depth at which said electric motor maintains said otter board comprising means for generating a controllable signal in said surface vessel and transmitting said signal to said control unit, said control unit being responsive to the depth thereof.

6. In combination, a surface vessel, a fish net, means for positioning said net at a predetermined depth comprising an otter board towed by said vessel and adapted to be connected to said net, a controllable diving plane attached to said otter board, means for controlling said plane in response to the depth of said otter board comprising a control unit, means in said control unit for generating a signal indicative of the depth thereof, a depth indicator on said vessel, and means for transmitting said signal to said vessel to actuate said depth indicator.

7. In a surface vessel provided with depth sounding means adapted to locate and record the depth of a school of fish, the improvement comprising a fish net, an otter board towed by said vessel and adapted to be connected to said net, a controllable diving plane attached to said otter board, an electric motor controlling said plane, a control unit connected to said electric motor for controlling the direction of rotation thereof, means for adjusting the depth at which said electric motor maintains said otter board comprising means for generating a controllable signal in said surface vessel and transmitting said signal to said control unit, said control unit being responsive to the depth thereof, means in said control unit for generating a signal indicative of the depth thereof, a depth indicator on said vessel, and means for transmitting said signal to said vessel to actuate said depth indicator.

8. In a surface vessel provided with depth sounding means adapted to locate and record the depth of a school of fish, the improvement comprising, a body connected to and towed by said vessel, means on said body for varying the depth of said body to conform to the indicated depth of said fish, means on said vessel connected to said body for controlling said depth-varying means on said body, means on said vessel for indicating the depth of said body, and means connected to said body for catching the said located fish.

9. In a surface vessel provided with depth sounding means adapted to locate and record the depth of a school of fish, the improvement comprising, a body connected to and towed by said vessel, means on said body for varying the depth of said body to conform to the indicated depth of said fish, means on said vessel connected to said body for controlling said depth-varying means on said body, means responsive to the depth of said body and said depth-varying means on said vessel for maintaining the depth of said body as determined by said depth-varying means on said vessel, means on said vessel for indicating the depth of said body, and means connected to said body for catching the said located fish.

10. In a surface vessel provided with depth sounding means adapted to locate and record the depth of a school of fish, the improvement comprising, a body connected to and towed by said vessel, means on said body for varying the depth of said body to conform to the indicated depth of said fish, cables connected to said body, means on said body, connected thereto by said cables, for controlling said depth varying means on said body, means responsive to the depth of said body and said depth-varying means on said vessel for maintaining the depth of said body as determined by said depth-varying means on said vessel, means on said vessel for indicating the depth of said body, said indicating means including a means for generating an electrical signal in response to the depth of said body and means for transmitting said signal from said body to said surface vessel, and means connected to said body for catching the said located fish.

References Cited in the file of this patent

UNITED STATES PATENTS

| | | |
|---|---|---|
| 418,889 | Cooper et al. | Jan. 7, 1890 |
| 880,069 | Garms | Feb. 25, 1908 |
| 1,358,358 | Burney | Nov. 9, 1920 |
| 1,690,578 | Hammond | Nov. 6, 1928 |
| 1,745,251 | Enright | Jan. 28, 1930 |
| 2,386,950 | Hopkins | Oct. 16, 1945 |
| 2,470,621 | Jacobsen | May 17, 1949 |
| 2,632,150 | Silverman et al. | Mar. 17, 1953 |

FOREIGN PATENTS

| | | |
|---|---|---|
| 11,704 | Great Britain | 1911 |
| 15,465 | Great Britain | 1903 |
| 16,639 | Norway | Sept. 24, 1906 |
| 43,216 | France | Apr. 6, 1934 |
| 339,149 | Great Britain | Dec. 4, 1930 |
| 584,673 | Germany | Sept. 22, 1933 |

OTHER REFERENCES

Popular Mechanics, August 1946 issue, page 149.